No. 29,295.
PATENTED JULY 24, 1860.
C. MARSH.
CRACKER MACHINE.
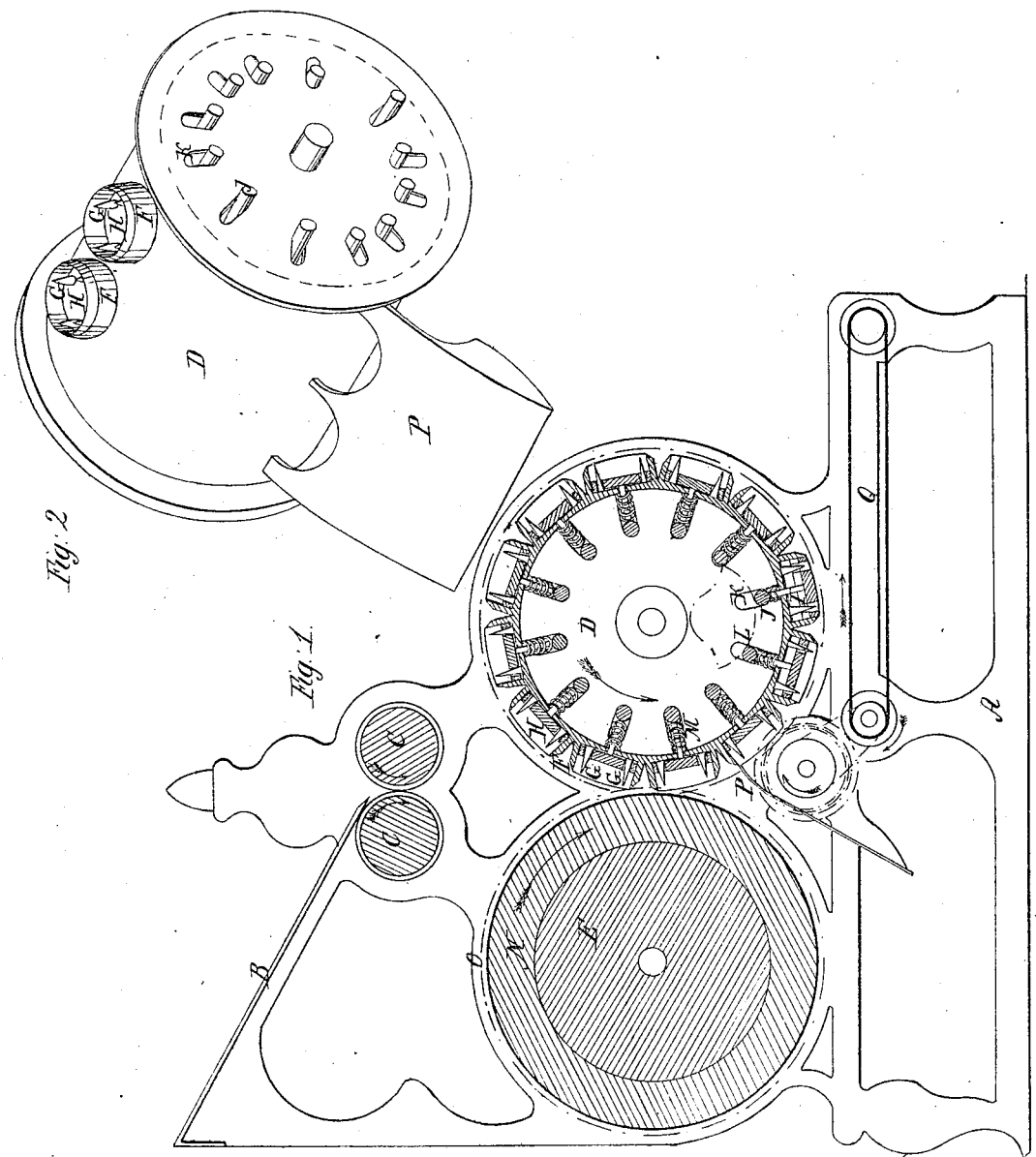
Witnesses;
John W. Chile
W. Yoke & Lee
Inventor;
Wright Brothers Atty
for Cyrus Marsh

UNITED STATES PATENT OFFICE.

CYRUS MARSH, 2ND, OF NATCHEZ, MISSISSIPPI.

CRACKER-MACHINE.

Specification of Letters Patent No. 29,295, dated July 24, 1860.

*To all whom it may concern:*

Be it known that I, CYRUS MARSH, 2nd, of Natchez, Adams county, Mississippi, have invented a new and useful Machine for Making Ship-Biscuit, Crackers, &c.; and I hereby declare the following to be a full and exact description of the same, reference being had to the accompanying drawings, making part of this specification, in which—

Figure 1, represents a transverse section of a machine embodying my improvements, and Fig. 2, a perspective view of the stamping cylinder.

A frame A supports at its upper part a sloping chute board B, leading to a pair of horizontal rollers C immediately beneath which are the stamping cylinder D and pressure cylinder E. The stamping cylinder consists of a drum whose periphery is studded with marginal formers or cutters F having the shape desired for the crackers, and being sharpened on their salient edges. From the periphery of the drum within these formers or cutters rise spikes G.

H are followers or pistons fitted to move in and out snugly in the formers, and perforated to admit the spikes G. From the back of each follower projects a shank I. The shanks of as many followers as occupy a common longitudinal position are united to a single cross head J whose extremities occupy radially slotted apertures K in the cylinder heads. The red lines L represent stationary cams (one on each inner side of the frame) which at the proper moment act to depress the cross head of each consecutive set of followers.

M are springs which the instant that the cylinder rotates past the cam retract the followers. The pressure cylinder E is covered first with a ring of gum elastic N and that with a strip of stout cotton duck or canvas O.

P is a scraper which projects from the frame so as to touch or nearly touch the periphery of the cylinder D between and on each side of the formers and thus rid it of the superfluous dough or scraps. This scraper serves also as a chute to conduct off the scraps.

Q is an endless carrier to conduct off the formed crackers.

The several parts above described are rotated as designated by the arrows by means of suitable geared or belted connection from the driving shaft.

Operation: Dough being placed upon the chute B is pushed forward so as to pass between the rollers C whence it passes in a slab of suitable thickness between the rollers D and E, the roller E acting to press the dough into the formers from which the crackers are afterward expelled by the followers and fall upon the carrier Q.

It will be seen that the arrangement of the scraper P and carrier Q, is such as to effectually separate the formed crackers from the surplus dough and deposit each in the distinct place appropriated thereto.

I do not claim any of the separate parts of the machine as new in themselves considered, but

What I claim as new, and of my invention herein as an improvement in cracker machines, is—

The described arrangement of the rollers C, stamping cylinder D, pressure cylinder E N O, scraper P and carrier Q, the said parts being constructed and combined and operating in the manner and for the purposes hereinbefore set forth.

In testimony of which invention, I hereunto set my hand.

CYRUS MARSH, 2ND.

Witnesses:
  GEO. H. KNIGHT,
  C. STEEMER, Jr.